Oct. 17, 1950  H. I. GUSTAFSON  2,525,899
DUMP VEHICLE
Filed Sept. 13, 1946
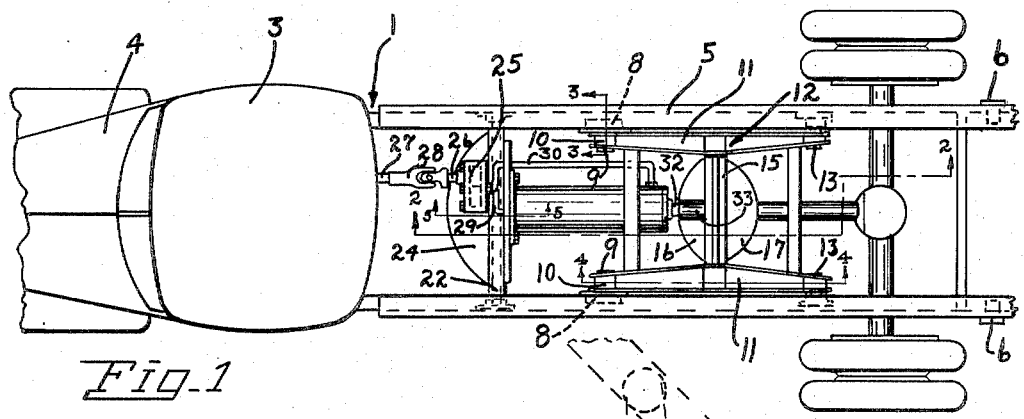
*Fig. 1*
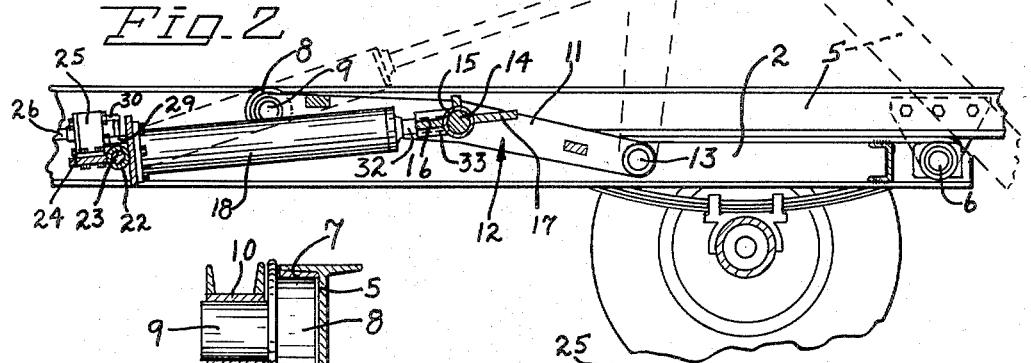
*Fig. 2*
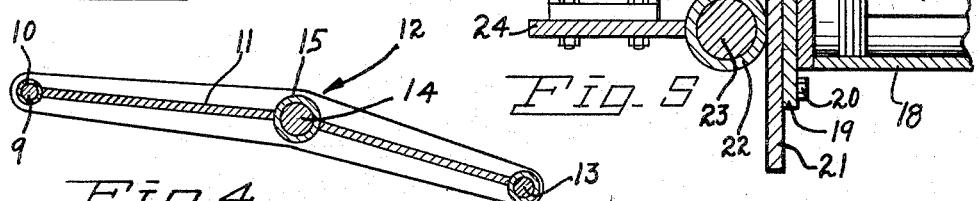
*Fig. 3*  *Fig. 5*  *Fig. 4*
INVENTOR
Harry I. Gustafson
BY
ATTORNEY Patented Oct. 17, 1950

2,525,899

UNITED STATES PATENT OFFICE 2,525,899

DUMP VEHICLE

Harry I. Gustafson, Spokane, Wash.

Application September 13, 1946, Serial No. 696,763

1 Claim. (Cl. 298—22)

This invention relates to a dump vehicle and it is one object of the invention to provide a dump vehicle wherein the body is pivotally mounted for tilting movement to a dumping position and moved to the dumping position by hydraulic mechanism.

Another object of the invention is to provide a dump vehicle wherein the body is carried by bars pivoted to the side bars of the chassis and engaged by rollers projecting from sides of a lifting frame which is pivoted at its rear end to the chassis bars and moved upwardly to a tilted position by the rod of a piston which operates in a cylinder and is shifted longitudinally by action of oil pumped into and out of end portions of the cylinder by a pump driven from a power take-off of the engine of the vehicle.

Another object of the invention is to provide a dump vehicle wherein the cylinder in which the piston operates and the pump for circulating oil through the cylinder are mounted at opposite sides of the rocker shaft so that during movement of the piston rod to raise and lower the lifting frame the cylinder may have tilting movement and thus maintain the piston rod in such angular relation to the lifting frame that pushing force may be exerted without bending the piston rod.

Another object of the invention is to provide a dump vehicle which is power actuated by the engine which constitutes the power plant of the vehicle and wherein the dumping or lifting mechanism is simple in construction and will not be liable to be broken when subjected to rough usage.

The invention is illustrated in the accompanying drawings wherein:

Fig. 1 is a top plan view of the improved dump vehicle, the body being omitted.

Fig. 2 is a sectional view taken along the line 2—2 of Figure 1.

Fig. 3 is a fragmentary transverse section taken along the line 3—3 of Figure 1.

Fig. 4 is a view showing the lifting frame in longitudinal section, the view being taken along the line 4—4 of Figure 1.

Fig. 5 is a fragmentary sectional view taken along the line 5—5 of Figure 1.

The improved dump vehicle constituting the subject matter of this invention is a motor vehicle and has the usual chassis 1 having side bars 2 and a driver's cab 3 and the usual engine or power plant (not shown) which is under the cowl 4 in front of the cab. Bars 5 for carrying the body (not shown) extend longitudinally of the chassis over the chassis bars 2 and are pivoted at their rear ends, as shown at 6, so that they may be swung upwardly to an inclined position when material is to be dumped from the body. The bars 5 are of I-beam formation, as shown in Figure 3, and rest upon the chassis bars when in the lowered position. Inner side portions of the upper flanges of the I-beams are reinforced by metal strips 7 serving as wear strips and these wear strips rest upon rollers 8 carried by stub shafts 9 mounted through bearings 10 at front ends of the side bars or arms 11 of a lifting frame 12. The lifting frame 12 extends longitudinally of the chassis between the bars 2 thereof and at their rear ends the side bars 11 are pivoted to the chassis bars by bearings 13. A shaft or cross bar 14 extends between the side bars of the lifting frame and about his shaft fits a sleeve 15 which is rotatable about the same and reinforced by front and rear plates or webs 16 and 17 which may be a continuous plate if so desired. When the lifting frame is swung upwardly to the raised position indicated by dotted lines in Figure 2 the bars 5 will be carried upwardly by the rollers 8 and the body of the vehicle will be supported at an incline for dumping. The side bars 5 follow the lifting frame downwardly when it is lowered and the vehicle body will return to its normal position in which it is supported for its length by the chassis bars 2.

Hydraulic pressure is employed to swing the lifting frame upwardly and move the vehicle body to a dumping position, and in order to exert such pressure there has been provided a cylinder 18 which extends longitudinally of the chassis and at its front end carries a mounting plate 19 which is secured by bolts or screws 20 to a supporting plate 21. This supporting plate extends transversely of the chassis in a vertical plane and is welded to a sleeve 22 which is rotatably mounted about a shaft 23 extending between and carried by the chassis bars. The sleeve constitutes a rocker shaft for tiltably mounting the cylinder and at the opposite side of this sleeve or rocker-shaft is mounted a bracket or platform 24 serving as a support for a rotary pump 25 of conventional construction. The shaft 26 of the pump is connected with the rear end of a drive shaft 27 by a universal coupling 28, and this drive shaft has its front end connected with a power take-off of the engine of the motor vehicle so that rotary motion may be transmitted to the pump gears when the frame 12 is to be raised and tilt the truck body to a dumping position. Pipes 29 and 30 connect the pump with opposite ends of the cylinder so that when the pump is operated in one direction oil will be forced into the front end of the cylinder and move the piston 31 and its piston rod 32 rearwardly, operation of the pump in an opposite direction serving to move the piston and the piston rod forwardly. The piston rod has its rear end secured in a socket 33 carried by the web or plate 16 midway the length of the sleeve 15 and as the piston rod is moved longitudinally the lifting frame will be swung about its pivots 13 to raised or lowered positions according to the direction in which the piston rod is moved. Since the sleeves 15 and 22 are rotatable about the shafts 14 and 23 and the shaft 26 is connected with shaft 27 by a universal joint the cylinder 18 may swing vertically from the position shown in full lines in Figure 2 to that indicated by dotted lines and tilt the truck body to a dumping position.

Having thus described the invention, what is claimed is:

In a dump vehicle, a chassis having side bars, body-supporting bars extending longitudinally of the chassis and pivoted at their rear ends to the chassis bars and resting upon the chassis bars when in a lowered position, said body-supporting bars having upper and lower side flanges, a lifting frame between the chassis bars extending longitudinally of the chassis and having side bars pivoted at their rear ends to inner sides of the chassis bars, rollers rotatably mounted at outer sides of front ends of the side bars and engaging under faces of the flanges of the body-supporting bars, a cross bar rockably mounted between the side bars of the lifting frame, a rocker shaft mounted between the chassis bars transversely thereof and located forwardly of the lifting frame, a cylinder carried by and extending from the rocker shaft rearwardly of the chassis at an upward incline and under the lifting frame, a piston in said cylinder having a rod extending through the rear end of the cylinder and having its rear end connected with the cross bar midway the length thereof for raising the lifting frame when the piston rod is shifted rearwardly, a plate projecting forwardly from the rocker shaft and constituting a shelf, and a pump mounted upon said plate and having pipes leading therefrom and connected with opposite ends of the cylinder whereby fluid may be circulated between the pump and the cylinder to shift the piston and its rod longitudinally and tilt the cylinder vertically to raise and lower the lifting frame.

HARRY I. GUSTAFSON.

REFERENCES CITED

The following references are of record in the file of this patent:

UNITED STATES PATENTS

| Number | Name | Date |
|---|---|---|
| 1,985,361 | Anthony et al. | Dec. 25, 1934 |
| 2,084,376 | Anthony | June 22, 1937 |
| 2,190,870 | Frentzel et al. | Feb. 20, 1940 |